(No Model.)

T. WILLIAMS.
WEED CUTTING ATTACHMENT FOR CULTIVATORS.

No. 302,876. Patented July 29, 1884.

Witnesses:

H. W. Wells.

Rich'd A. Goldsborough.

Inventor,

Thomas Williams, per A. B. Upham,
His Attorney.

United States Patent Office.

THOMAS WILLIAMS, OF PUTNAM, ILLINOIS.

WEED-CUTTING ATTACHMENT FOR CULTIVATORS.

SPECIFICATION forming part of Letters Patent No. 302,876, dated July 29, 1884.

Application filed December 17, 1883. (No model.)

*To all whom it may concern:*

Be it known that I, THOMAS WILLIAMS, of Putnam, in the county of Putnam, in the State of Illinois, have invented an Improved Weed-Cutting Attachment for Cultivators; and I do hereby declare that the following is a full, clear, and exact description thereof, reference being had to the annexed drawings, making a part of this specification, in which like letters of reference refer to like parts, and in which—

Figure 1:
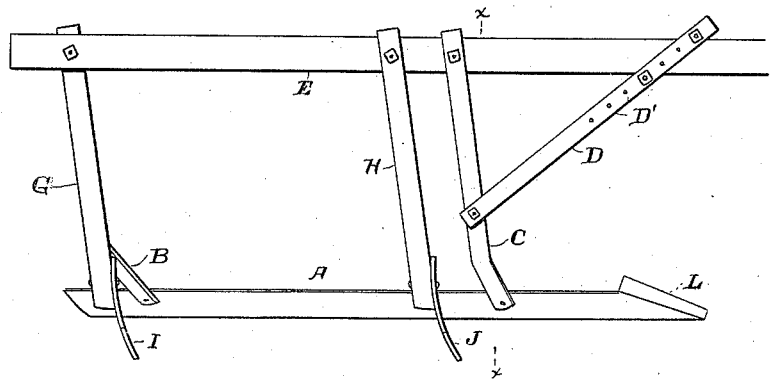
Figure 2:
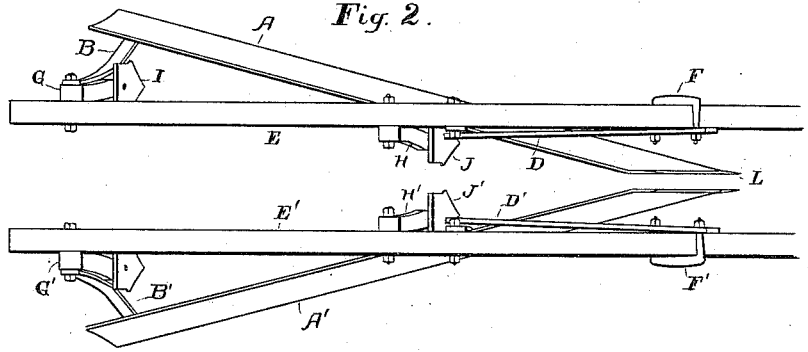
Figure 3:
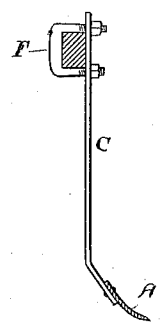

Figure 1 represents a side elevation of the same; Fig. 2, a plan view; Fig. 3, a section at *x x*.

My invention relates to an attachment for cultivators, by means of which the weeds may be cut off an inch or so below the ground from between the rows of corn, and the clean soil alone thrown over upon the corn.

In the drawings, A represents the weed-cutting blade immediately in front of the cultivator-blades I J of one part of the cultivator, and A' represents the blade in front of the plows I' J' of the other portion of the cultivator. The said blade A is supported by the bars B and C, which are pivotally secured thereto and to the beam E. In case the beam E is of wood, ordinary bolts suffice for fastening said bars B C thereto; but in the case of iron beams E the bars B C are secured in place by the clamps F. Said bars B C are held from pivotal deflection by means of the brace-rod D. By fastening this brace-rod D to the beam E in different bolt-holes, D', the blade A can be retained at any desired height to suit the cultivator with which it is used or the condition of the soil and weeds.

To retain the blade A against the pressure of the soil and the weeds it is cutting, one or both of the bars C and B are bent to an obtuse angle near their lower ends, as shown in Fig. 3, and the vertical portion of each allowed to rest against the sheth of its neighboring plow-blade. The front end of the blade A is bent forward somewhat and sharpened, so that any weeds or vines lying upon the ground may be severed by said edge L.

As shown in Fig. 3, the blade A is curved in cross-section to bring its cutting-edge approximately horizontal, and thereby cut more readily the weeds and soil.

What I claim as my invention is—

1. In a cultivator of the kind in which a horizontal weed-cutting blade is fastened in front of the cultivator-plows, the combination, with such a blade, of the bars B and C, brace-rod D, beam E, sheths G H, and plows I J, substantially as and for the purpose specified.

2. The weed-cutting blade A, having frontal edge L, bent bars B and C, brace-rod D, and clamps F, in combination with the beam E, sheths G H, and plows I J, substantially as and for the purpose set forth.

In testimony that I claim the foregoing invention I have hereunto set my hand this 14th day of December, 1883.

THOMAS WILLIAMS.

Witnesses:
J. M. MORSE,
W. E. S. BUELL.